(12) United States Patent
Chen et al.

(10) Patent No.: US 10,051,211 B2
(45) Date of Patent: Aug. 14, 2018

(54) IMAGE SENSORS FOR CAPTURING BOTH VISIBLE LIGHT IMAGES AND INFRARED LIGHT IMAGES, AND ASSOCIATED SYSTEMS AND METHODS

(71) Applicant: OmniVision Technologies, Inc., Santa Clara, CA (US)

(72) Inventors: Gang Chen, San Jose, CA (US); Duli Mao, Sunnyvale, CA (US); Dyson Hsinchih Tai, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 549 days.

(21) Appl. No.: 14/097,843

(22) Filed: Dec. 5, 2013

(65) Prior Publication Data

US 2015/0163418 A1 Jun. 11, 2015

(51) Int. Cl.
*H04N 5/33* (2006.01)
*H04N 9/04* (2006.01)
*H04N 5/232* (2006.01)

(52) U.S. Cl.
CPC ......... *H04N 5/332* (2013.01); *H04N 5/23245* (2013.01); *H04N 9/045* (2013.01)

(58) Field of Classification Search
CPC ...................................................... H04N 5/332
See application file for complete search history.

(56) References Cited

U.S. PATENT DOCUMENTS

| 8,408,821 B2 | 4/2013 | Wu et al. | |
|---|---|---|---|
| 8,908,040 B2* | 12/2014 | Lu | H04N 5/2258 348/148 |
| 2007/0146512 A1* | 6/2007 | Suzuki | H04N 5/332 348/272 |
| 2007/0147193 A1* | 6/2007 | Wada | G03B 11/00 369/44.14 |
| 2010/0220228 A1* | 9/2010 | Otake | H01L 27/14621 348/311 |
| 2011/0181752 A1* | 7/2011 | Nakashima | H04N 9/045 348/223.1 |
| 2012/0025080 A1* | 2/2012 | Liu | H04N 5/332 250/332 |
| 2012/0026325 A1* | 2/2012 | Bunker | G03B 11/00 348/143 |
| 2012/0026339 A1* | 2/2012 | Kojima | H04N 5/2256 348/164 |

(Continued)

OTHER PUBLICATIONS

Translation of a Office Action corresponding to Taiwanese Patent Application No. 103140324, dated Jul. 29, 2016, 4 pages.

*Primary Examiner* — Dave Czekaj
*Assistant Examiner* — Tyler W Sullivan
(74) *Attorney, Agent, or Firm* — Lathrop Gage LLP

(57) ABSTRACT

An image sensor for capturing both visible light images and infrared light images includes a semiconductor substrate having length, width, and height, a plurality of visible light photodetectors disposed in the semiconductor substrate, and a plurality of combination light photodetectors disposed in the semiconductor substrate. Each of the plurality of visible light photodetectors has a respective depth in the height direction, and each of the plurality of combination light photodetectors has a respective depth in the height direction that is greater than the respective depth of each of the plurality of visible light photodetectors.

7 Claims, 9 Drawing Sheets

(56) References Cited

U.S. PATENT DOCUMENTS

| | | | | |
|---|---|---|---|---|
| 2012/0087645 A1* | 4/2012 | Wu | ............... | H04N 5/33 |
| | | | | 396/439 |
| 2012/0241618 A1* | 9/2012 | Hsu | ............... | H01L 27/1462 |
| | | | | 250/338.1 |
| 2013/0234029 A1* | 9/2013 | Bikumandla | ......... | H01L 25/043 |
| | | | | 250/349 |
| 2013/0250103 A1 | 9/2013 | Lu et al. | | |
| 2013/0265438 A1* | 10/2013 | Sugiyama | ............... | H04N 5/33 |
| | | | | 348/164 |
| 2015/0036105 A1* | 2/2015 | Ide | ............... | H04N 9/3129 |
| | | | | 353/31 |
| 2016/0181314 A1* | 6/2016 | Wan | ............... | H01L 27/14612 |
| | | | | 348/302 |

* cited by examiner

IMAGE SENSORS FOR CAPTURING BOTH VISIBLE LIGHT IMAGES AND INFRARED LIGHT IMAGES, AND ASSOCIATED SYSTEMS AND METHODS

BACKGROUND

Many imaging systems operate during both day and night. For example, security imaging systems often capture surveillance photos or surveillance video twenty four hours a day. As another example, automobile rearview imaging systems typically must be capable of capturing video during both day and night.

During the day, sunlight is normally sufficient to illuminate a scene for imaging. However, for nighttime imaging, an artificial light source is usually required to sufficiently illuminate a scene. Although the artificial light source can be a visible light source, the artificial light source is commonly an infrared light source. Accordingly, many imaging systems that operate during both night and day must be capable of capturing images under both visible light and infrared light scene illumination.

It is common, though, for an image scene to be illuminated by both visible and infrared light. For example, sunlight contains infrared light, as well as visible light. As another example, a scene illuminated at night primarily by an infrared artificial light source may also be partially illuminated by visible light from a nearby stray light source. Thus, an image sensor that is sensitive to both visible and infrared light will often generate image data from both visible and infrared light. It is generally undesirable, however, to mix visible light image data and infrared light image data because they may interfere with each other.

One conventional approach to preventing simultaneous generation of image data from both visible and infrared light is to filter light incident on an image sensor according to expected or desired illumination. In particular, during the day, or during times when visible light illumination is anticipated, an infrared blocking filter is mechanically switched into the image sensor's optical path, thereby blocking infrared light from reaching the image sensor. During the night, or during times when infrared light illumination is anticipated, the infrared blocking filter is removed and a visible light blocking filter is switched into the optical path, thereby preventing visible light from reaching the image sensor. Although such filtering techniques may provide satisfactory results, they generally require moving parts which are typically expensive and failure prone.

SUMMARY

In an embodiment, an image sensor for capturing both visible light images and infrared light images includes a semiconductor substrate having length, width, and height, a plurality of visible light photodetectors disposed in the semiconductor substrate, and a plurality of combination light photodetectors disposed in the semiconductor substrate. Each of the plurality of visible light photodetectors has a respective depth in the height direction, and each of the plurality of combination light photodetectors has a respective depth in the height direction that is greater than the respective depth of each of the plurality of visible light photodetectors.

In an embodiment, a system for imaging a scene includes an image sensor for capturing both visible light images and infrared light images, a sensor data generator, and a channel controller. The image sensor includes a semiconductor substrate having length, width, and height, a plurality of visible light photodetectors disposed in the semiconductor substrate, and a plurality of combination light photodetectors disposed in the semiconductor substrate. Each of the plurality of visible light photodetectors has a respective depth in the height direction, and each of the plurality of combination light photodetectors has a respective depth in the height direction that is greater than the respective depth of each of the plurality of visible light photodetectors. The sensor data generator generates sensor data from respective signals generated by each of the plurality of visible light photodetectors and from respective signals generated by each of the plurality of combination light photodetectors. The channel controller is adapted to filter the sensor data to generate output data, such that (a) the output data represents the signals generated by each of the plurality of visible light photodetectors, in a visible light operating mode of the system, and (b) the output data represents the signals generated by each of the plurality of combination light photodetectors, in an infrared light operating mode of the system.

In an embodiment, a method for operating a system including an image sensor for capturing both visible light images and infrared light images includes the steps of (a) generating sensor data representing light incident on the image sensor, (b) generating a visible light magnitude signal from the sensor data, the visible light magnitude signal representing a sum of red, green, and blue light incident on the image sensor, (c) generating a combination light magnitude signal from the sensor data, the combination light magnitude signal representing a sum of white and infrared light incident on the image sensor, (d) subtracting the visible light magnitude signal from the combination light magnitude signal to generate a difference signal, (e) comparing the difference signal to first and second threshold values, (f) causing the system to switch from a visible light operating mode to an infrared light operating mode in response to the difference signal rising above the first threshold value, and (g) causing the system to switch from the infrared light operating mode to the visible light operating mode in response to the difference signal falling below the second threshold value.

In an embodiment, a method for operating a system including an image sensor for capturing both visible light images and infrared light images includes the steps of (a) generating sensor data representing light incident on the image sensor, (b) generating a visible light magnitude signal from the sensor data, the visible light magnitude signal representing substantially only green light incident on the image sensor, (c) generating a combination light magnitude signal from the sensor data, the combination light magnitude signal representing a sum of green and infrared light incident on the image sensor, (d) subtracting the visible light magnitude signal from the combination light magnitude signal to generate a difference signal, (e) comparing the difference signal to first and second threshold values, (f) causing the system to switch from a visible light operating mode to an infrared light operating mode in response to the difference signal rising above the first threshold value, and (g) causing the system to switch from the infrared light operating mode to the visible light operating mode in response to the difference signal falling below the second threshold value.

In an embodiment, a method for operating a system including an image sensor for capturing both visible light images and infrared light images includes the steps of (a) generating sensor data representing light incident on the image sensor, (b) generating a visible light magnitude signal from the sensor data, the visible light magnitude signal representing a sum of red, green, and blue light incident on the image sensor, (c) comparing the visible light magnitude signal to first and second threshold values, (d) causing the system to switch from a visible light operating mode to an infrared light operating mode in response to the visible light magnitude signal falling below the first threshold value, and (e) causing the system to switch from the infrared light operating mode to the visible light operating mode in response to the visible light magnitude signal rising above the second threshold value.

DETAILED DESCRIPTION OF THE EMBODIMENTS

Applicants have developed image sensors for capturing both visible light images and infrared light images. Certain embodiments of the image sensors do not require moving parts. Additionally, certain systems encompassing the image sensors are capable of automatically switching between visible light and infrared light operating modes, as discussed below.

Figure 1:
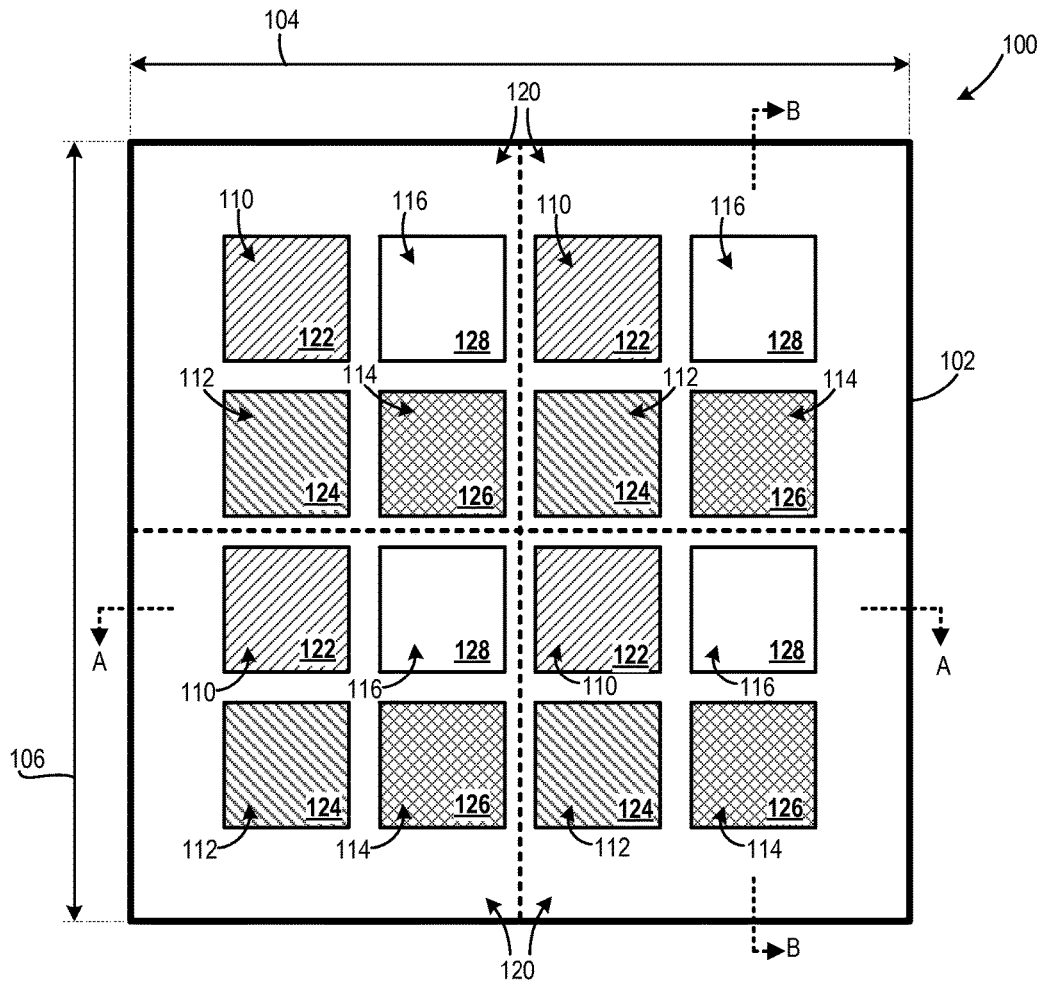
FIG. 1 is a top plan view of one exemplary image sensor for capturing both visible light images and infrared light images, according to an embodiment.
Figure 2:
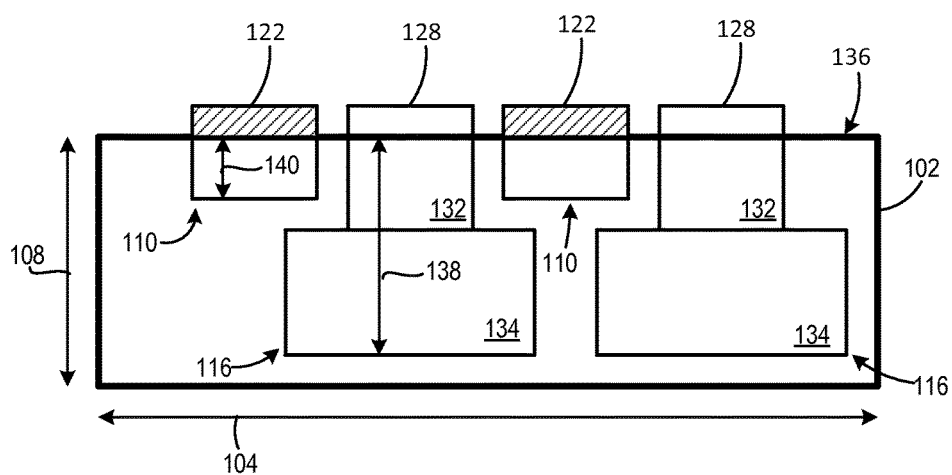
FIG. 2 is a cross-sectional view of the FIG. 1 image sensor taken along line A-A of FIG. 1.
Figure 3:
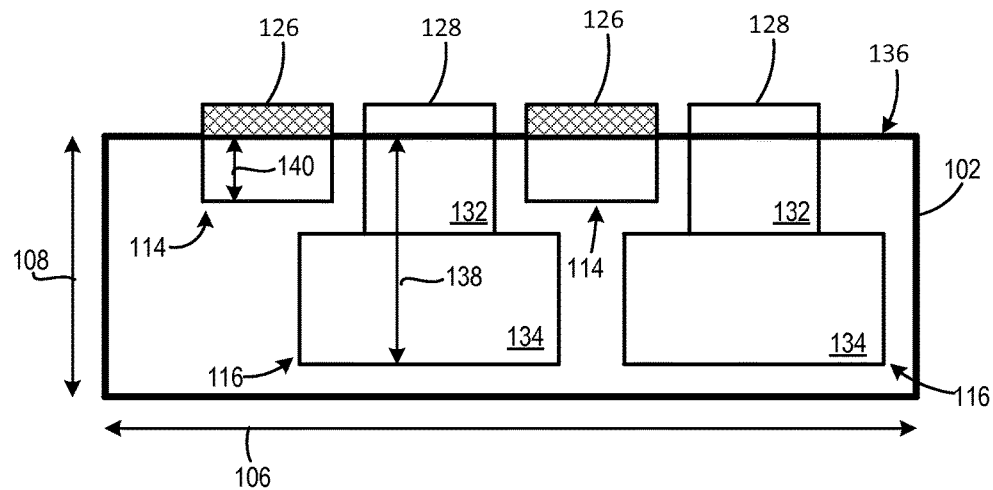
FIG. 3 is a cross-sectional view of the FIG. 1 image sensor taken along line B-B of FIG. 1.

FIG. 1 is a top plan view of an image sensor 100 for capturing both visible light images and infrared light images. FIGS. 2 and 3 are cross-sectional views of image sensor 100 taken along lines A-A and B-B, respectively, of FIG. 1. FIGS. 1-3 are best viewed together in the following discussion.

Image sensor 100 includes a semiconductor substrate 102, such as a silicon substrate, having length 104, width 106, and height 108. A plurality of visible light photodetectors 110, 112, 114 and combination light photodetectors 116 are disposed in semiconductor substrate 102 to form an array of unit cells 120 in the lengthwise 104 by widthwise 106 directions. Visible light photodetectors 110, 112, 114 and combination light photodetectors 116 are formed, for example, by implanting n-type dopants, such as arsenic or phosphorus, into semiconductor substrate 102. Although image sensor 100 is shown as including only four unit cells 120 for illustrative simplicity, it is anticipated that many embodiments will include many more unit cells 120.

Each unit cell 120 includes one each of visible light photodetectors 110, 112, and 114, and one combination light photodetector 116, disposed in a square pattern. A red color filter 122, which passes substantially only red light, is disposed over and in optical alignment with each visible light photodetector 110, so that each visible light photodetector 110 generates a respective signal in response to red light incident thereon. Similarly, a green color filter 124, which passes substantially only green light, is disposed over and in optical alignment with each visible light photodetector 112, so that each visible light photodetector 112 generates a respective signal in response to green light incident thereon. Additionally, a blue color filter 126, which passes substantially only blue light, is disposed over and in optical alignment with each visible light photodetector 114, so that each visible light photodetector 114 generates a respective signal in response to blue light incident thereon. Furthermore, a white-IR filter 128, which passes substantially only white light and infrared light, is disposed over and in optical alignment with each combination light photodetector 116, so that each combination light photodetector 116 generates a respective signal in response to white light and/or infrared light incident thereon. Accordingly, color filters 122, 124, 126, and 128 of unit cells 120 collectively form a red-green-blue-white color filter pattern. In some alternate embodiments, however, white-IR filters 128 are omitted, so that combination light photodetectors 116 receive unfiltered light.

Each combination light photodetector 116 includes a first portion 132 and a second portion 134 stacked in the height 108 direction. (See FIGS. 2 and 3). First portion 132 is disposed relatively close to semiconductor substrate outer surface 136 and absorbs primarily visible light, because visible light penetrates relatively little of semiconductor substrate 102's depth. Second portion 134, on the other hand, is disposed below first portion 132 and therefore absorbs primarily infrared light, because infrared light penetrates relatively deeply into semiconductor substrate 102. In some embodiments, such as shown in the present figures, second portions 134 have a larger cross-sectional area in the lengthwise 104 by widthwise 106 directions than first portions 132, to promote high infrared light sensitivity and to help minimize cross-talk. Furthermore, in some embodiments, each second portion 134 extends under at least one visible light photodetector 110, 112, 114 in the height 108 direction, to help maximize second portion 134 cross-sectional area while minimizing pitch of the visible light photodetectors. Accordingly, each combination light photodetector 116 has a respective depth 138 in the height 108 direction which is greater than a respective depth 140 in the height 108 direction of each visible light photodetector 110, 112, 114. In some embodiments, each first portion 132 has a respective n-type dopant concentration which is greater than that of each second portion 134.

Figure 4:
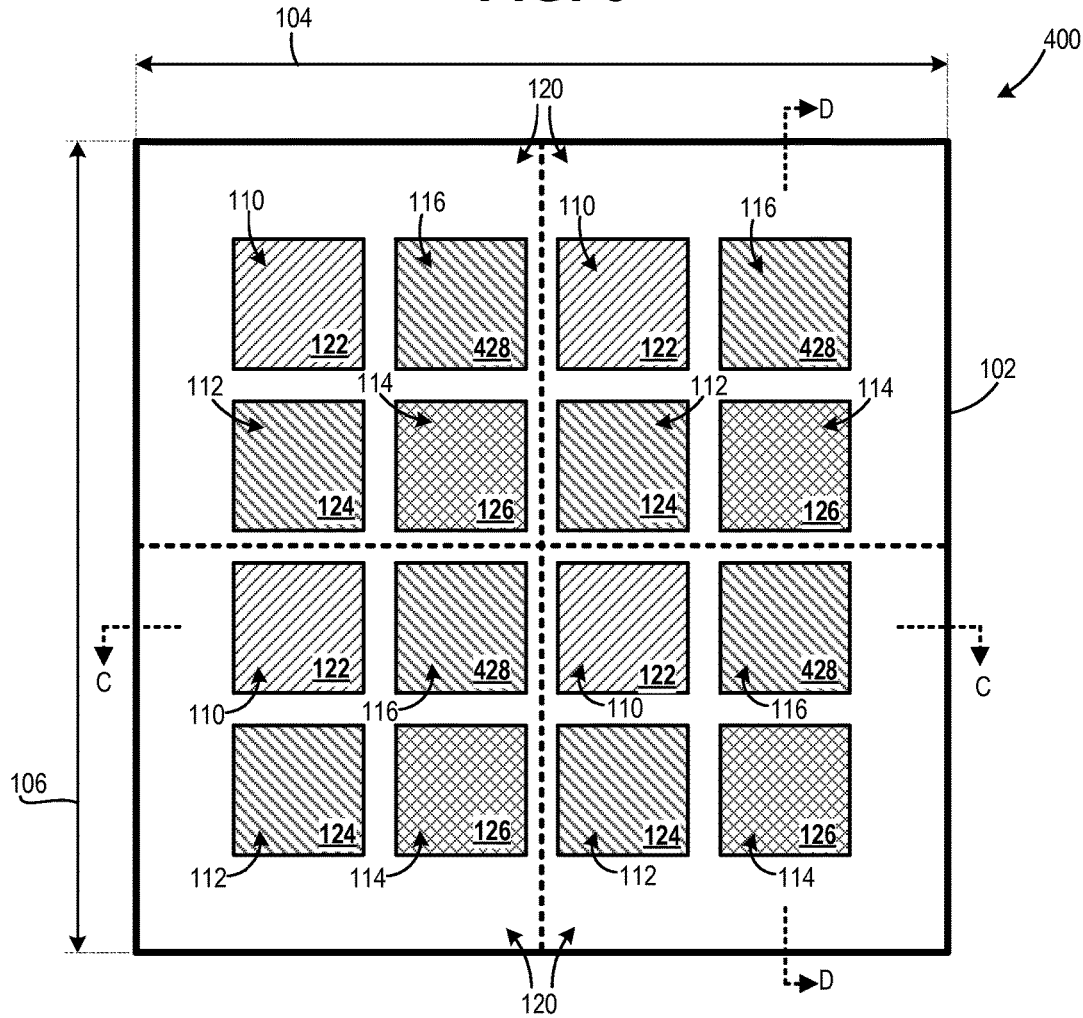
FIG. 4 is a top plan view of another exemplary image sensor for capturing both visible light images and infrared light images, according to an embodiment.
Figure 5:
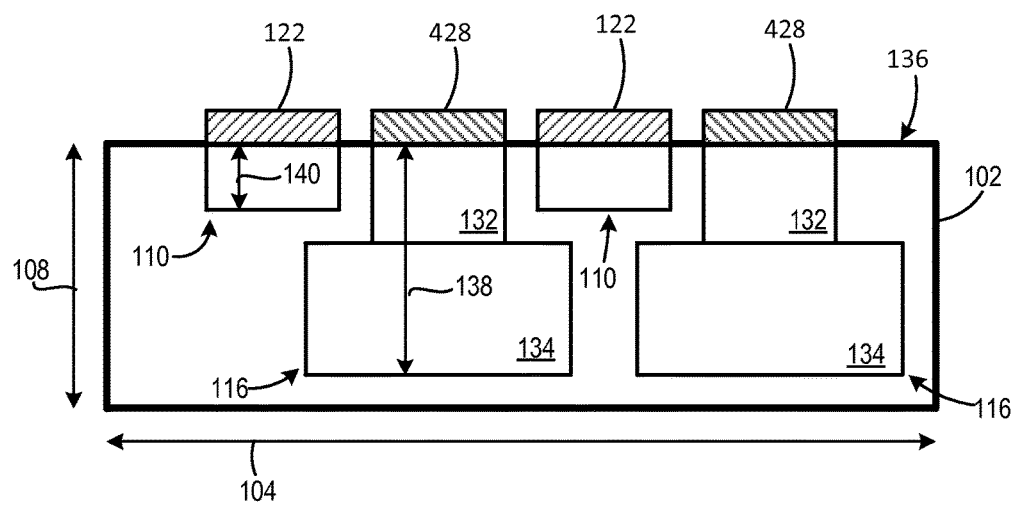
FIG. 5 is a cross-sectional view of the FIG. 4 image sensor taken along line C-C of FIG. 4.
Figure 6:
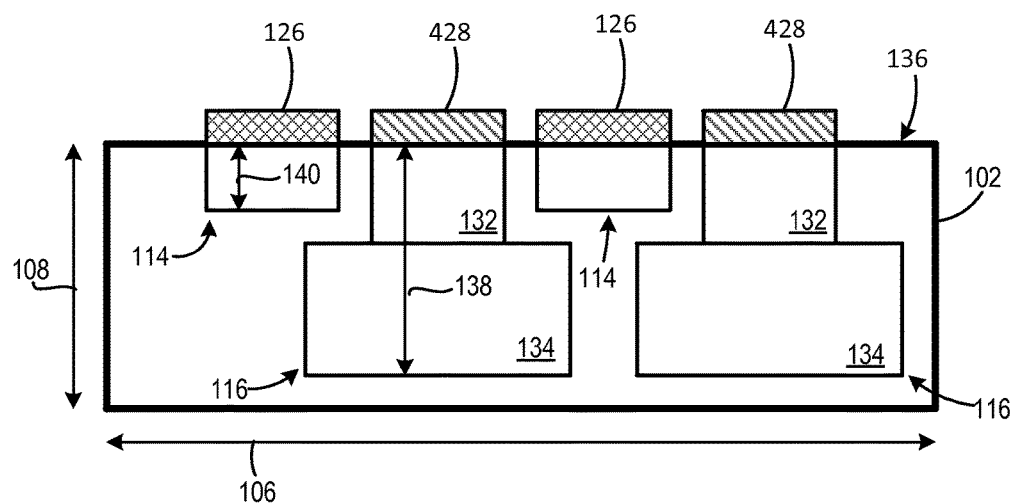
FIG. 6 is a cross-sectional view of the FIG. 4 image sensor taken along line D-D of FIG. 4.

FIGS. 4-6 illustrate another image sensor for use with either visible light illumination or infrared light illumination. FIG. 4 is a top plan view of an image sensor 400, and FIGS. 5 and 6 are cross-sectional views of image sensor 400 taken along lines C-C and D-D, respectively, of FIG. 4. FIGS. 4-6 are best viewed together in the following discussion.

Image sensor 400 is similar to image sensor 100 but FIG. 1, but image sensor 400 has a Bayer color filter pattern, characterized by two green color filters, one red color filter, and one blue color filter in each unit cell 120, instead of a red-green-blue-white color filter pattern. In particular, a respective green-IR color filter 428, instead of a white-IR color filter 128, is disposed over and in optical alignment with each combination light photodetector 116. Each green-IR color filter passes substantially only green and infrared light. As a result, each combination light photodetector 116 generates a respective signal in response to green light and/or infrared light incident thereon. The fact that each combination light photodetector 116 is sensitive to the same color visible light as a visible light photodetector of each unit cell 120 may be exploited to help detect scene illumination conditions, as discussed below.

The color filter pattern of image sensor 400 could be modified, as long combination light photodetector 116 and at least one visible light photodetector 110, 112, 114 of each unit cell 120 have the same type of visible light color filter. For example, in a particular alternate embodiment, cyan, yellow, and magenta color filters are disposed over and in optical alignment with visible light photodetectors 110, 112, and 114, respectively, and yellow-IR color filters are disposed over and in optical alignment with combination light photodetectors 116, to form a cyan-yellow-yellow-magenta color filter pattern.

Figure 7:
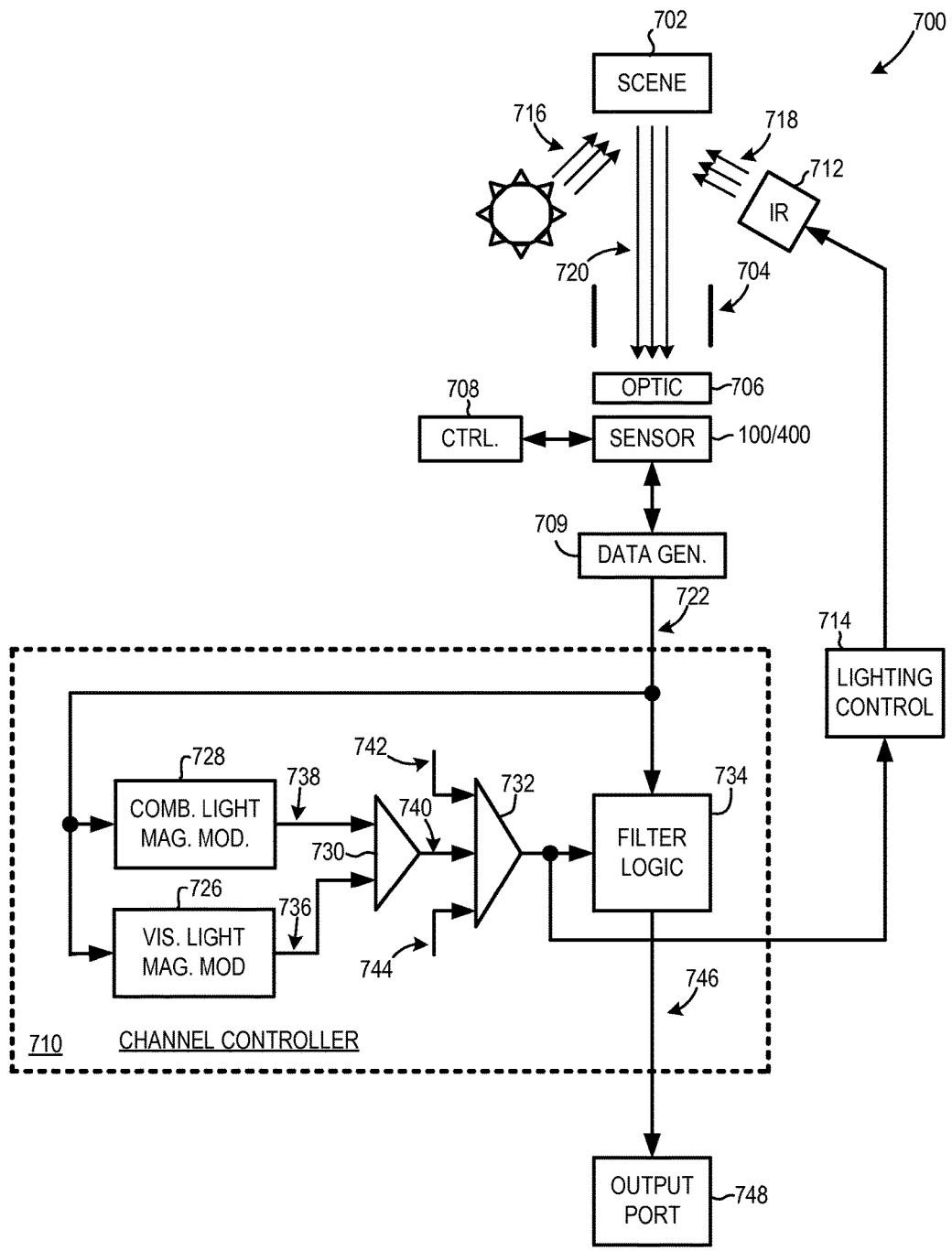
FIG. 7 illustrates one exemplary system for imaging a scene, according to an embodiment.

FIG. 7 illustrates a system 700 for imaging a scene 702, which is one possible application of the image sensors disclosed herein. System 700 includes an aperture 704, an optic 706, image sensor 100 of FIG. 1, an image sensor controller 708, a sensor data generator 709, a channel controller 710, an infrared light source 712, and a lighting controller 714.

Scene 702 is illuminated by visible light 716, such as sunlight, and/or by infrared light 718 from infrared light source 712. Light 720 reflected from scene 702 enters aperture 704 and is imaged by optic 706 onto image sensor 100. Optic 706 includes, for example, one or more lenses. Image sensor controller 708 controls image sensor 100. For example, in some embodiments, image sensor controller 708 controls accumulation and reading of charge in each photodetector 110, 112, 114, 116. Sensor data generator 709 generates sensor data 722 from signals generated by each visible light photodetector 110, 112, 114, and by each combination light photodetector 116, in image sensor 100.

Channel controller 710 causes system 700 to automatically switch between a visible light operating mode and an infrared light operating mode. Channel controller 710 includes a visible light magnitude module 726, a combination light magnitude module 728, a subtraction module 730, a comparison module 732, and filter logic 734. Visible light magnitude module 726 generates a visible light magnitude signal 736 from sensor data 722, where visible light magnitude signal 736 represents a sum of red, green, and blue light incident on image sensor 100. Combination light magnitude module 728, on the other hand, generates a combination light magnitude signal 738 from sensor data 722, where combination light magnitude signal 738 represent a sum of white and infrared light incident on image sensor 100.

Subtraction module 730 subtracts visible light magnitude signal 736 from combination light magnitude signal 738 to generate a difference signal 740. When scene 702 is illuminated primarily by visible light 716, the sum of red, green, and blue light incident on image sensor 100 will be roughly the same as white light incident on image sensor 100, because white light includes red, green, and blue light. Therefore, difference signal 740 will be small when scene 702 is illuminated primarily by visible light 716. In contrast, when scene 702 is illuminated primarily by infrared light 718, significantly more infrared light will be incident on image sensor 100 than red, green, and blue light. Therefore, difference signal 740 will be large when scene 702 is illuminated primarily by infrared light 718.

Comparison module 732 compares difference signal 740 to a first threshold value 742 and to a second threshold value 744. Comparison module 732 causes system 700 to switch from its visible light operating mode to its infrared light operating mode in response to difference signal 740 rising above first threshold value 742, and comparison module 732 causes system 700 to switch from its infrared light operating mode to its visible light operating mode in response to difference signal 740 falling below second threshold value 744. Although first threshold value 742 and second threshold value 744 could be the same, it is expected that first threshold value 742 will typically be larger than second threshold value 744 to achieve hysteresis when switching between operating modes.

Filter logic 734 filters sensor data 722 to generate output data 746, which is communicatively coupled to an output port 748, according to system operating mode. In the visible light operating mode of system 700, filter logic 734 filters sensor data 722 such that output data 746 represents red, green, and blue light incident on image sensor 100, or in other words, such that output data 746 represents signals generated by visible light photodetectors 110, 112, 114 of image sensor 100. In the infrared light operating mode of system 700, filter logic 734 filters sensor data 722 such that output data 746 represents white and infrared light incident on image sensor 100, or in other words, such that output data 746 represents signals generated by combination light photodetectors 116 of image sensor 100. Output data 746 is, for example, post-processed by an imaging processing module (not shown), displayed on an output device (not shown), and/or stored for future use.

Lighting controller 714 controls operation of infrared light source 712, at least in part, based on the operating mode of system 700. In particular, lighting controller 714 activates infrared light source 712 when system 700 switches from in its visible light operating mode to its infrared light operating mode, and lighting controller 714 deactivates infrared light source 712 when system 700 switches from its infrared light operating mode to its visible light operating mode. In some alternate embodiments, however, lighting controller 714 controls operation of infrared light source 712 independently of system 700 operating mode, such as according to time of day.

In an alternate embodiment of system 700, image sensor 100 is replaced with image sensor 400 of FIG. 4, and visible light magnitude module 726 and combination light magnitude module 728 are modified to account for the differences between image sensor 100 and image sensor 400. In particular, visible light magnitude module 726 is modified such that visible light magnitude signal 736 represents substantially only green light incident on image sensor 100, and combination light magnitude module 728 is modified such that combination light magnitude signal 738 represents a sum of green and infrared light incident on image sensor 400. Visible light magnitude signal 736 and combination light magnitude signal 738 in this alternate embodiment indicate scene 702 illumination in a manner similar to that discussed above. In particular, when scene 702 is illuminated primarily by visible light 716, visible light magnitude signal 736 will have roughly the same value as combination light magnitude signal 738. In contrast, when scene 702 is illuminated primarily by infrared light 718, the value of visible light magnitude signal 736 will be significantly less than that of combination light magnitude signal 738. In the infrared light operating mode, output data 746 represents green and infrared light incident on image sensor 400 because combination light photodetectors 116 of image sensor 400 are responsive to green and infrared light, as discussed above.

Figure 12:
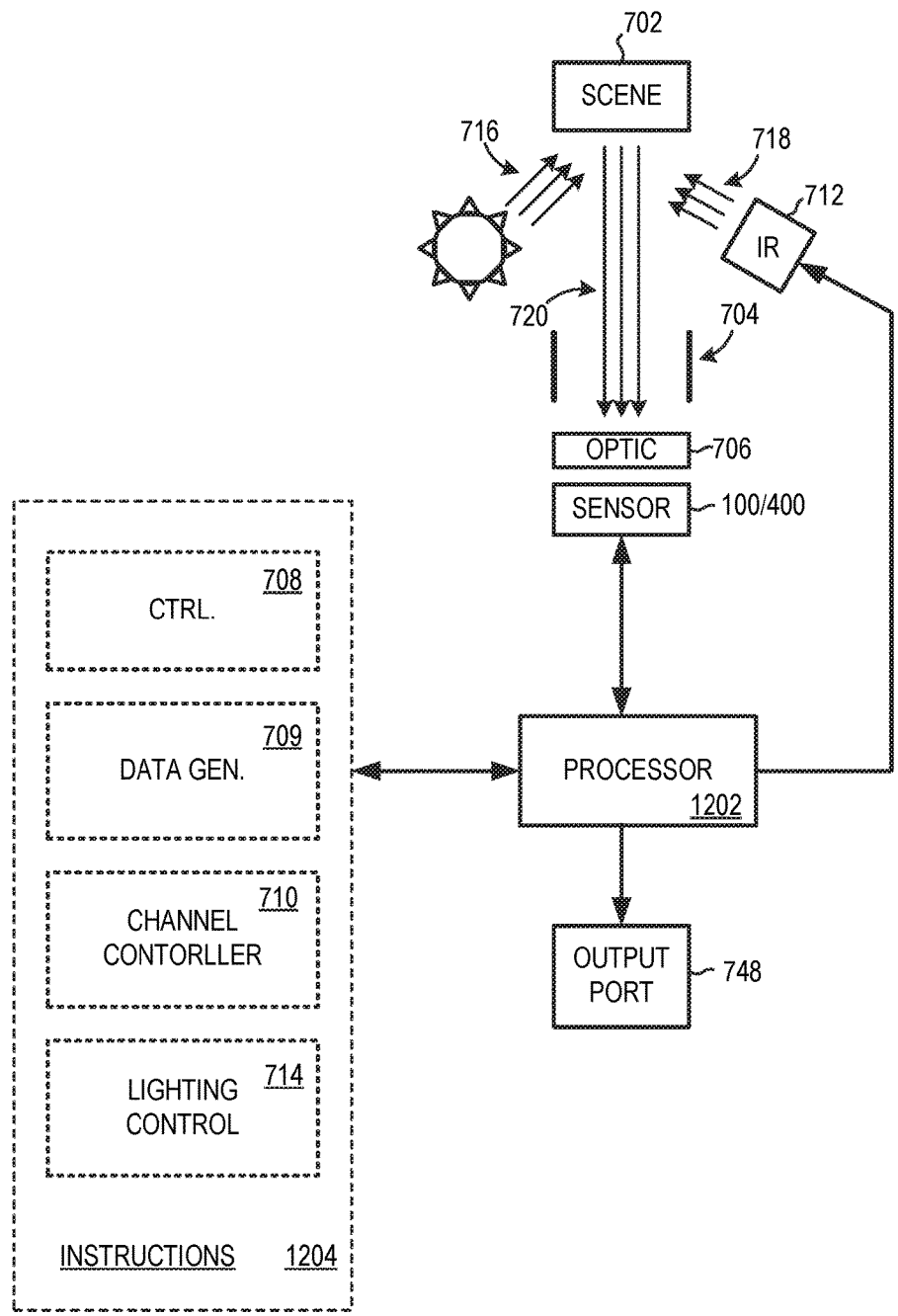
FIG. 12 illustrates one embodiment of the FIG. 7 system including a processor executing instructions to at least partially perform functions of an image sensor controller, a sensor data generator, a channel controller, and a lighting controller.

The elements of system 700 could be combined in various ways without departing from the scope hereof. For example, in some embodiments, one or more of image sensor controller 708, sensor data generator 709, and channel controller 710 are integrated with image sensor 100. Image sensor controller 708, sensor data generator 709, channel controller 710, and lighting controller 714 may be implemented by one or both of discrete circuitry and software including machine readable instructions executed by a processor. For example, FIG. 12 illustrates one embodiment of system 700 where a processor 1202 communicatively coupled to image sensor 100 or 400 executes instructions 1204 to at least partially perform the functions of image sensor controller 708, sensor data generator 709, channel controller 710, and lighting controller 714.

Figure 8:
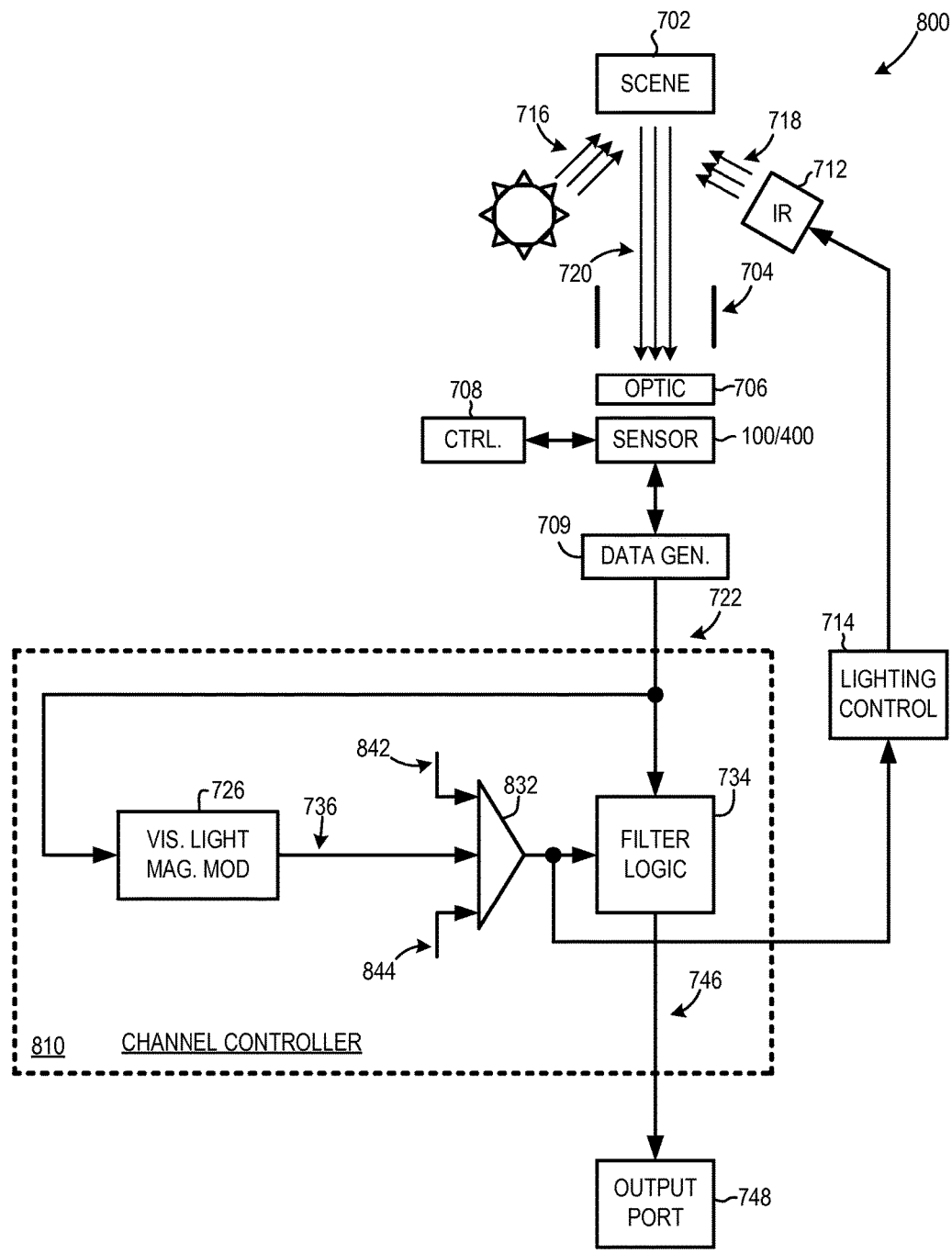
FIG. 8 illustrates another exemplary system for imaging a scene, according to an embodiment.

FIG. 8 illustrates a system 800 for imaging scene 702. System 800 is similar to system 700, but with channel controller 810 substituted for channel controller 710. Channel controller 810 includes visible light magnitude module 726 which generates visible light magnitude signal 736 representing the sum of red, green, and blue light incident on image sensor 100, as discussed above with respect to FIG. 7. Channel controller 810 further includes a comparison module 832 which determines system 800's operating mode based on the value of visible light magnitude signal 736. In particular, comparison module 832 compares visible light magnitude signal 736 to a first threshold value 842 and to a second threshold value 844. Comparison module 832 causes system 800 to switch from its visible light operating mode to its infrared light operating mode in response to visible light magnitude signal 736 falling below first threshold value 842, and comparison module 832 causes system 800 to switch from its infrared light operating mode to its visible light operating mode in response to visible light magnitude signal 736 rising above second threshold value 844. Although first threshold value 842 and second threshold value 844 could be the same, it is expected that second threshold value 844 will typically be larger than first threshold value 842 to achieve hysteresis when switching between operating modes. Filter logic 734 of channel controller 810, and the remainder of system 800, operate in the same manner as system 700.

System 800 could be modified to include image sensor 400 of FIG. 4 in place of image sensor 100. Additionally, channel controller 810 could be modified to further include combination light magnitude module 728, subtraction module 730, and comparison module 732 of FIG. 7, so that operating mode changes as a function of both (1) difference between visible light magnitude signal 736 and combination light magnitude signal 738, and (2) value of visible light magnitude signal 736. One of comparison modules 732 and 832 would need to override the other comparison module, however, in case of operating mode conflict between the two comparison modules.

Figure 9:
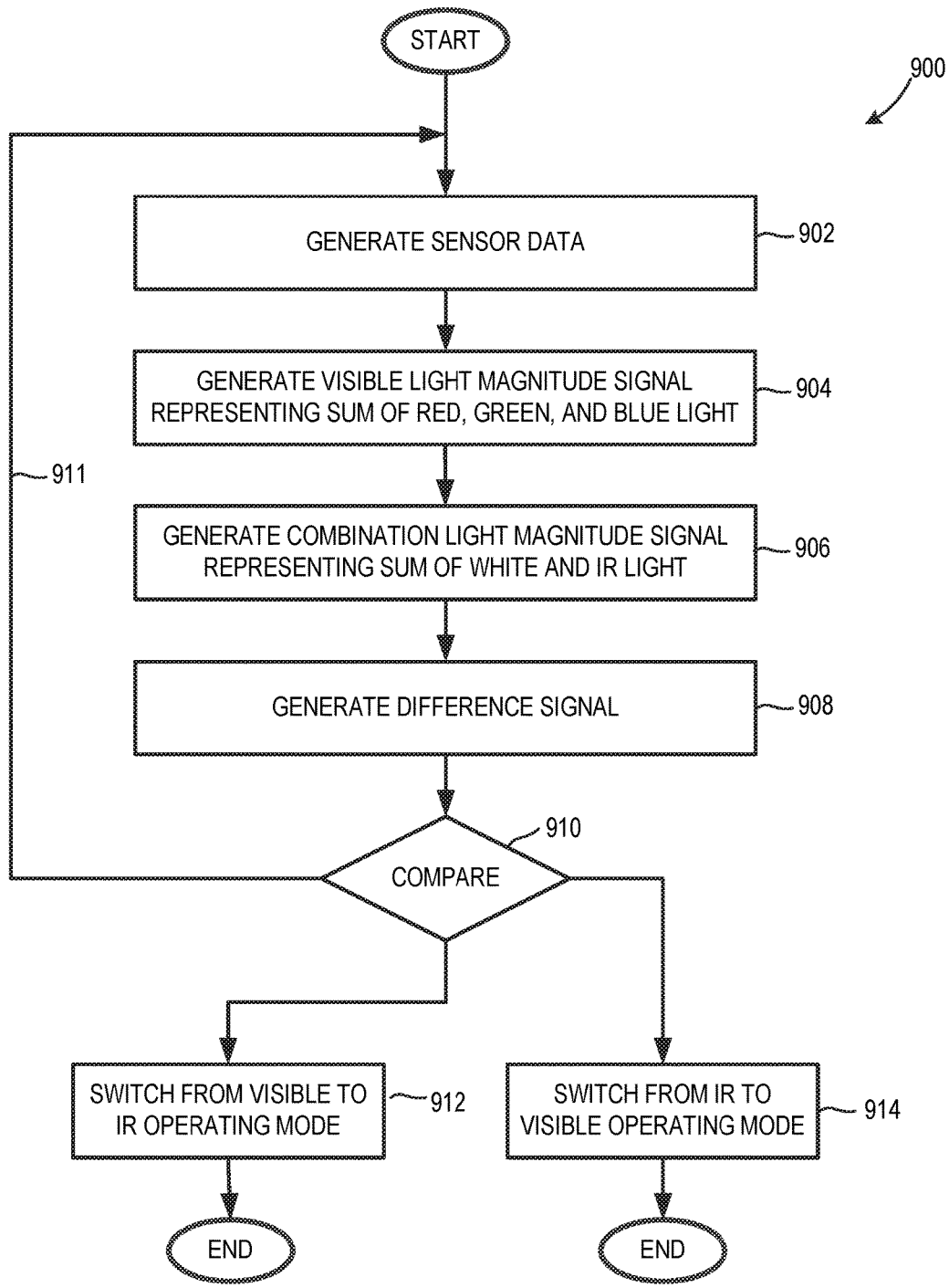
FIG. 9 illustrates a method for operating a system including an image sensor for capturing both visible light images and infrared light images, according to an embodiment.

FIG. 9 illustrates a method 900 for operating a system including an image sensor for capturing both visible light images and infrared light images. Sensor data representing light incident on the image sensor is generated in step 902. In one example of step 902, sensor data generator 709 generates sensor data 722 from signals generated by visible light photodetectors 110, 112, 114, and by combination light photodetectors 116, of image sensor 100. (See, e.g., FIGS. 1 and 7).

A visible light magnitude signal, representing a sum of red, green, and blue light incident on the image sensor, is generated from the sensor data in step 904. In one example of step 904, visible light magnitude module 726 generates visible light magnitude signal 736 representing the sum of red, blue, and green light incident on image sensor 100. A combination light magnitude signal representing a sum of white and infrared light incident on the image sensor is generated from the sensor data in step 906. In one example of step 906, combination light magnitude module 728 generates combination light magnitude signal 738 representing the sum of white and infrared light incident on image sensor 100.

In step 908, the visible light magnitude signal is subtracted from the combination light magnitude signal to generate a difference signal. In one example of step 908, subtraction module 730 subtracts visible light magnitude signal 736 from combination light magnitude signal 738 to generate difference signal 740. In step 910, the difference signal is compared to first and second threshold values. If the difference signal is greater than the first threshold value, operation proceeds to step 912. If the difference signal is less than the second threshold value, operation proceeds to step 914. Otherwise, operation returns 911 to step 902. In one example of step 910, comparison module 732 compares difference signal 740 to first threshold value 742 and to second threshold value 744. In step 912, the system is switched from a visible light operating mode to an infrared light operating mode in response to the difference signal rising above the first threshold value. In one example of step 912, comparison module 732 causes system 700 to switch from the visible light operating mode to the infrared light operating mode in response to difference signal 740 rising above first threshold value 742. In step 914, the system is switched from the infrared light operating mode to the visible light operating mode in response to the difference signal falling below the second threshold value. In one example of step 914, comparison module 732 causes system 700 to switch from its infrared light operating mode to its visible light operating mode in response to difference signal 740 falling below second threshold value 744.

Figure 10:
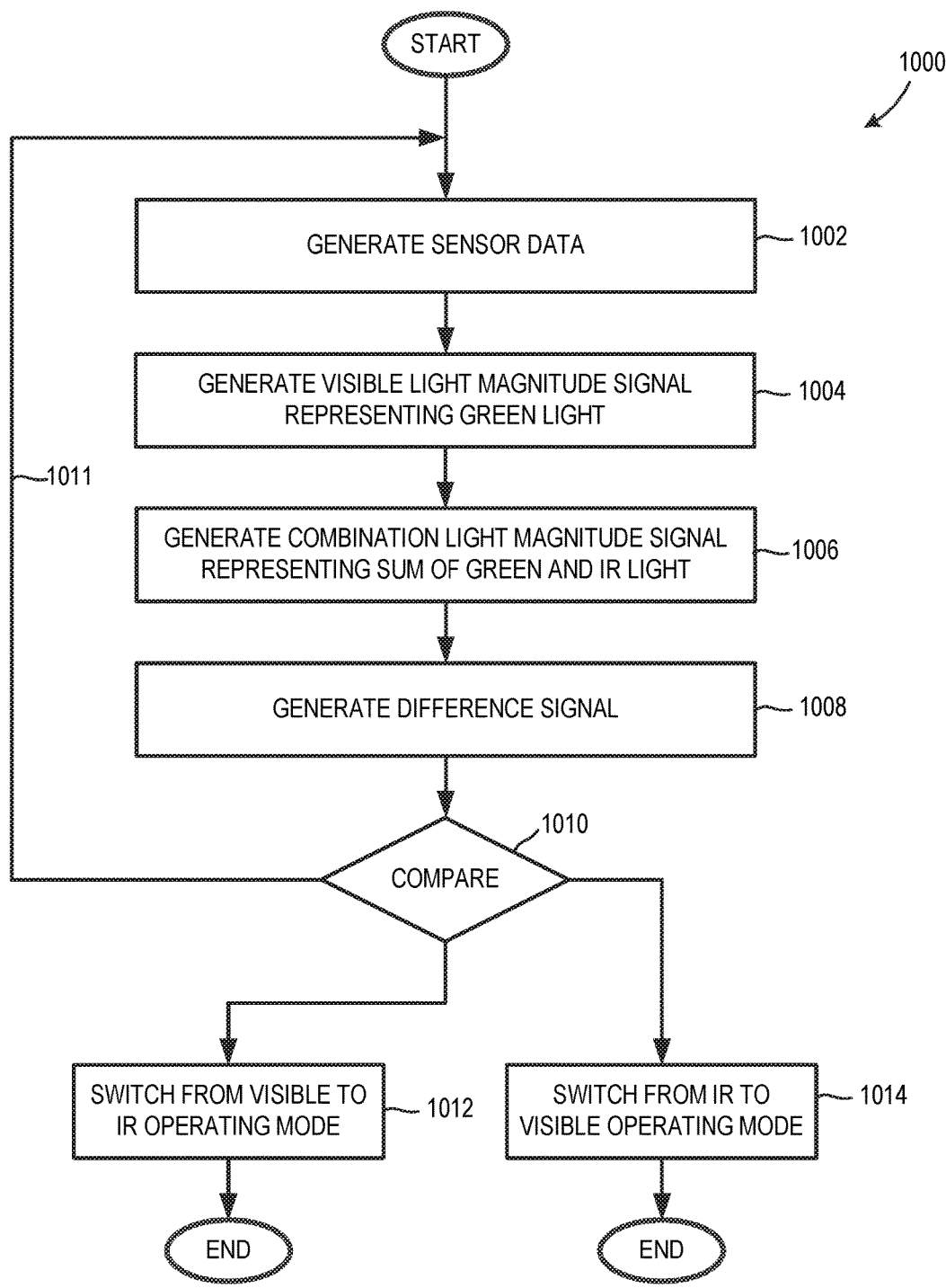
FIG. 10 illustrates another method for operating a system including an image sensor for capturing both visible light images and infrared light images, according to an embodiment.

FIG. 10 illustrates another method 1000 for operating a system including an image sensor for capturing both visible light images and infrared light images. Sensor data representing light incident on the image sensor is generated in step 1002. In one example of step 1002, sensor data generator 709 generates sensor data 722 from signals generated by visible light photodetectors 110, 112, 114, and from signals generated by combination light photodetectors 116, of image sensor 400. (See, e.g., FIGS. 4 and 7).

A visible light magnitude signal, representing substantially only green light incident on the image sensor, is generated from the sensor data in step 1004. In one example of step 1004, visible light magnitude module 726 generates visible light magnitude signal 736 representing green light incident on image sensor 400. A combination light magnitude signal representing a sum of green and infrared light incident on the image sensor is generated from the sensor data in step 1006. In one example of step 1006, combination light magnitude module 728 generates combination light magnitude signal 738 representing a sum of green and infrared light incident on image sensor 400.

In step 1008, the visible light magnitude signal is subtracted from the combination light magnitude signal to generate a difference signal. In one example of step 1008, subtraction module 730 subtracts visible light magnitude signal 736 from combination light magnitude signal 738 to generate difference signal 740. In step 1010, the difference signal is compared to first and second threshold values. If the difference signal is greater than the first threshold value, operation proceeds to step 1012. If the difference signal is less than the second threshold value, operation proceeds to step 1014. Otherwise, operation returns 1011 to step 1002. In one example of step 1010, comparison module 732 compares difference signal 740 to first threshold value 742 and to second threshold value 744. In step 1012, the system is switched from a visible light operating mode to an infrared light operating mode in response to the difference signal rising above the first threshold value. In one example of step 1012, comparison module 732 causes system 700 to switch from the visible light operating mode to the infrared light operating mode in response to difference signal 740 rising above first threshold value 742. In step 1014, the system is switched from the infrared light operating mode to the visible light operating mode in response to the difference signal falling below the second threshold value. In one example of step 1014, comparison module 732 causes system 700 to switch from its infrared light operating mode to its visible light operating mode in response to difference signal 740 falling below second threshold value 744.

Figure 11:
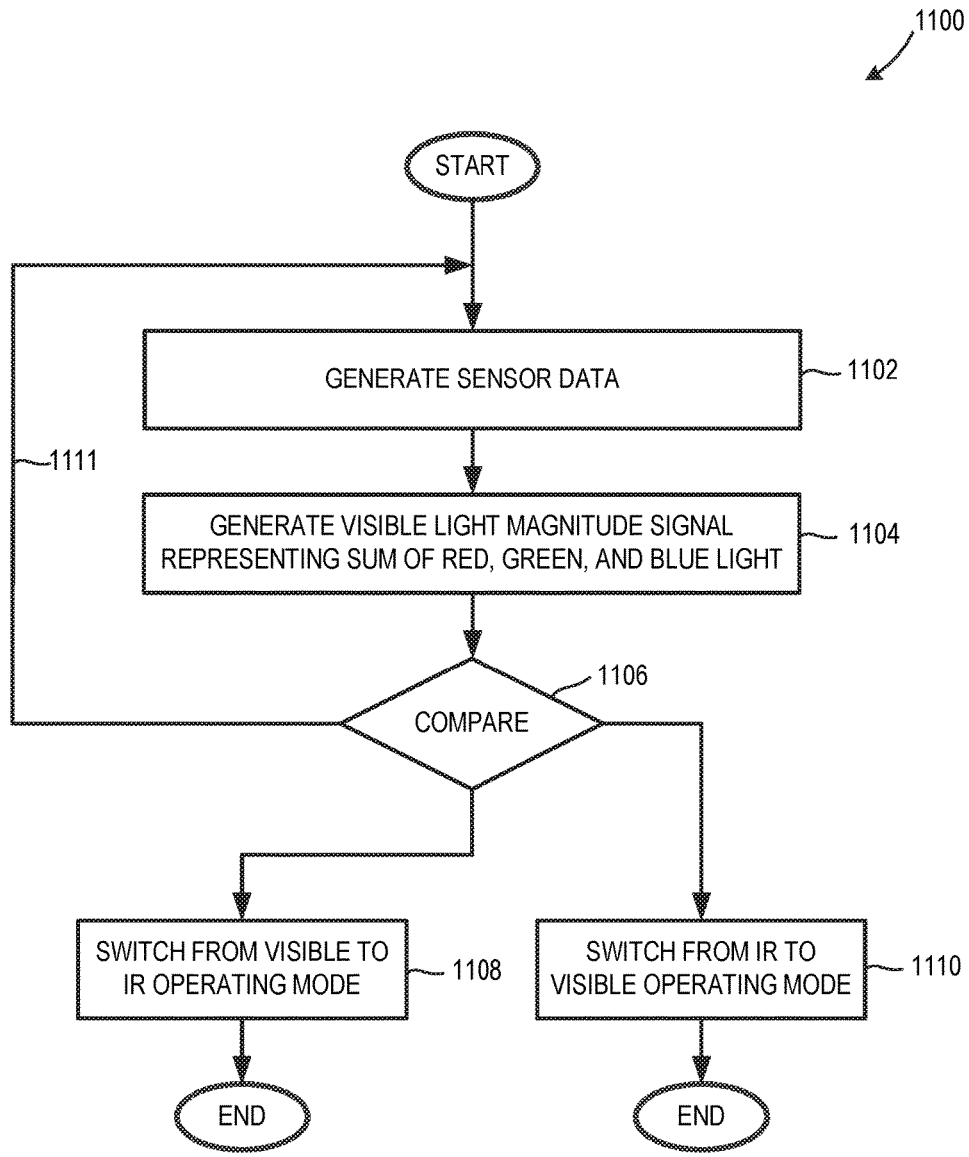
FIG. 11 illustrates yet another method for operating a system including an image sensor for capturing both visible light images and infrared light images, according to an embodiment.

FIG. 11 illustrates yet another method 1100 for operating a system including an image sensor for capturing both visible light images and infrared light images. Sensor data, representing light incident on the image sensor, is generated in step 1102. In one example of step 1102, sensor data generator 709 generates sensor data 722 from signals generated by visible light photodetectors 110, 112, 114, and from signals generated by combination light photodetectors 116, of either image sensor 100 or 400. (See, e.g., FIGS. 1, 4, and 8).

A visible light magnitude signal, representing a sum of red, green, and blue light incident on the image sensor, is generated from the sensor data in step 1104. In one example of step 1104, visible light magnitude module 726 generates visible light magnitude signal 736 representing a sum of red, blue, and green light incident on either image sensor 100 or image sensor 400. In step 1106, the visible light magnitude signal is compared to first and second threshold values. If the visible light magnitude signal is greater than the first threshold value, operation proceeds to step 1108. If the visible light magnitude signal is less than the second threshold value, operation proceeds to step 1110. Otherwise, operation returns 1111 to step 1002. In one example of step 1106, comparison module 832 compares visible light magnitude signal 736 to first threshold value 842 and to second threshold value 844. In step 1108, the system is switched from a visible light operating mode to an infrared light operating mode in response to the visible light magnitude signal falling below the first threshold value. In one example of step 1108, comparison module 832 causes system 800 to switch from the visible light operating mode to the infrared light operating mode in response to visible light magnitude signal 736 falling below first threshold value 842. In step 1110, the system is switched from the infrared light operating mode to the visible light operating mode in response to the visible light magnitude signal rising above the second threshold value. In one example of step 1110, comparison module 832 causes system 700 to switch from its infrared light operating mode to its visible light operating mode in response to visible light magnitude signal 736 rising above second threshold value 844.

Combinations of Features

Features described above as well as those claimed below may be combined in various ways without departing from the scope hereof. The following examples illustrate some possible combinations:

(A1) An image sensor for capturing both visible light images and infrared light images may include a semiconductor substrate having length, width, and height, a plurality of visible light photodetectors disposed in the semiconductor substrate, and a plurality of combination light photodetectors disposed in the semiconductor substrate. Each of the plurality of visible light photodetectors may have a respective depth in the height direction, and each of the plurality of combination light photodetectors may have a respective depth in the height direction that is greater than the respective depth of each of the plurality of visible light photo detectors.

(A2) In image sensor denoted as (A1), each of the plurality of combination light photodetectors may include a first portion and a second portion stacked in the height direction.

(A3) In the image sensor denoted as (A2), in each of the plurality of combination light photodetectors, the first portion may have a lengthwise by widthwise first cross-sectional area, the second portion may have a lengthwise by widthwise second cross-sectional area, and the second cross-sectional area may be greater than the first cross-sectional area.

(A4) In either of the image sensors denoted as (A2) or (A3), the second portion of at least one of the plurality of combination light photodetectors may extend under one or more the plurality of visible light photodetectors in the height direction.

(A5) In any of the image sensors denoted as (A2) through (A4), in each of the plurality of combination light photodetectors, the first portion may have an n-type doping of a first concentration, the second portion may have an n-type doping of a second concentration, and the first concentration may be greater than the second concentration.

(A6) Any of the image sensors denoted as (A1) through (A5) may further include the following: (a) a plurality of red color filters adapted to pass substantially only red light, where each of the plurality of red color filters is in optical alignment with a respective one of the plurality of visible light photodetectors, (b) a plurality of green color filters adapted to pass substantially only green light, where each of the plurality of green color filters is in optical alignment with a respective one of the plurality of visible light photodetectors, (c) a plurality of blue color filters adapted to pass substantially only blue light, where each of the plurality of blue color filters is in optical alignment with a respective one of the plurality of visible light photodetectors, and (d) a plurality of white-IR color filters adapted to pass substantially only white light and infrared light, where each of the plurality of white-IR color filters is in optical alignment with a respective one of the plurality of combination light photodetectors. The plurality of red, green, blue, and white-IR color filters may collectively form a red-green-blue-white color filter pattern.

(A7) Any of the image sensors denoted as (A1) through (A5) may further include the following: (a) a plurality of red color filters adapted to pass substantially only red light, where each of the plurality of red color filters is in optical alignment with a respective one of the plurality of visible light photodetectors, (b) a plurality of green color filters adapted to pass substantially only green light, where each of the plurality of green color filters is in optical alignment with a respective one of the plurality of visible light photodetectors, (c) a plurality of blue color filters adapted to pass substantially only blue light, where each of the plurality of blue color filters is in optical alignment with a respective one of the plurality of visible light photodetectors, and (d) a plurality of green-IR color filters adapted to pass substantially only green light and infrared light, where each of the plurality of green-IR color filters is in optical alignment with a respective one of the plurality of combination light photodetectors. The plurality of red, green, blue, and green-IR color filters may collectively form a Bayer color filter pattern.

(B1) A system for imaging a scene may include a first image sensor selected from any one of the image sensors denoted above as (A1) through (A7), a sensor data generator, and a channel controller. The sensor data generator may generate sensor data from respective signals generated by each of the plurality of visible light photodetectors, and from respective signals generated by each of the plurality of combination light photodetectors, of the first image sensor. The channel controller may be adapted to filter the sensor data to generate output data, such that (a) the output data represents the signals generated by each of the plurality of visible light photodetectors of the first image sensor, in a visible light operating mode of the system, and (b) the output data represents the signals generated by each of the plurality of combination light photodetectors of the first image sensor, in an infrared light operating mode of the system.

(B2) In the system denoted as (B1), the channel controller may include a visible light magnitude module, a combination light magnitude module, a subtraction module, and a comparison module. The visible light magnitude module may be adapted to generate a visible light magnitude signal from the sensor data, where the visible light magnitude signal represents a sum of red light, green light and blue light incident on the image sensor. The combination light magnitude module may be adapted to generate a combination light magnitude signal from the sensor data, where the combination light magnitude signal represents a sum of white and infrared light incident on the image sensor. The subtraction module may be adapted to generate a difference signal by subtracting the visible light magnitude signal from the combination light magnitude signal. The comparison module may be adapted to (a) compare the difference signal to first and second threshold values, (b) cause the system to switch from the visible light operating mode to the infrared light operating mode in response to the difference signal rising above the first threshold value, and (c) cause the system to switch from the infrared light operating mode to the visible light operating mode in response to the difference signal falling below the second threshold value.

(B3) In the system denoted as (B1), the channel controller may include a visible light magnitude module, a combination light magnitude module, a subtraction module, and a comparison module. The visible light magnitude module may be adapted to generate a visible light magnitude signal from the sensor data, where the visible light magnitude signal represents substantially only green light incident on the image sensor. The combination light magnitude module may be adapted to generate a combination light magnitude signal from the sensor data, where the combination light magnitude signal represents a sum of green and infrared light incident on the image sensor. The subtraction module may be adapted to generate a difference signal by subtracting the visible light magnitude signal from the combination light magnitude signal. The comparison module may be adapted to (a) compare the difference signal to first and second threshold values, (b) cause the system to switch from the visible light operating mode to the infrared light operating mode in response to the difference signal rising above the first threshold value, and (c) cause the system to switch from the infrared light operating mode to the visible light operating mode in response to the difference signal falling below the second threshold value.

(B4) In the system denoted as (B1), the channel controller may include a visible light magnitude module and a comparison module. The visible light magnitude module may be adapted to generate a visible light magnitude signal from the sensor data, where the visible light magnitude signal represents a sum of red light, green light and blue light incident on the image sensor. The comparison module may be adapted to (a) compare the visible light magnitude signal to first and second threshold values, (b) cause the system to switch from the visible light operating mode to the infrared light operating mode in response to the visible light magnitude signal falling below the first threshold value, and (c) cause the system to switch from the infrared light operating mode to the visible light operating mode in response to the visible light magnitude signal rising above the second threshold value.

(B5) Any of the systems denoted as (B1) through (B4) may further include a lighting controller and an infrared light source adapted to illuminate the scene with infrared light. The lighting controller may be adapted to (a) activate the infrared light source in response to the system switching from the visible light operating mode to the infrared light operating mode, and (b) deactivate the infrared light source in response to the system switching from the infrared light operating mode to the visible light operating mode.

Changes may be made in the above methods and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:
1. A system for imaging a scene, comprising:
   an image sensor for capturing both visible light images and infrared light images, including:
      a plurality of visible color filters,
      a plurality of visible light photodetectors disposed in a single semiconductor substrate having a light-receiving top surface and a bottom surface there opposite, each of the plurality of visible light photodetectors
         (i) having a respective depth in a depth direction perpendicular to the light-receiving top surface, and
         (ii) being between a respective one of the plurality of visible color filters and the bottom surface, and
      a plurality of white-IR filters each passing substantially only white light and infrared light, a plurality of combination light photodetectors disposed in the single semiconductor substrate, each of the plurality of combination light photodetectors (a) having a respective depth in the depth direction that is greater than the respective depth of each of the plurality of visible light photodetectors, (b) being between a respective one of the plurality of white-IR color filters and the bottom surface,
- (c) including a first portion and a second portion both located entirely between the light-receiving top surface and the bottom surface, the first portion disposed between the light-receiving top surface and the second portion, such that the first portion absorbs primarily white light and the second portion absorbs primarily infrared light, and
- (d) being configured to generate a signal in response to the white light and infrared light incident on the combination light photodetector; and a processor communicatively coupled to the image sensor and configured to execute machine-readable instructions to:
  generate sensor data from respective signals generated by each of the plurality of visible light photodetectors and from respective signals generated by each of the plurality of combination light photodetectors, and
  filter the sensor data to generate output data, such that:
    the output data represents the signals generated by each of the plurality of visible light photodetectors, in a visible light operating mode of the system, and
    the output data represents the signals generated by each of the plurality of combination light photodetectors, in an infrared light operating mode of the system.

2. The system of claim 1, the processor further configured to execute machine-readable instructions to:
  generate a white light magnitude signal from the sensor data, the white light magnitude signal representing a sum of red light, green light and blue light incident on the image sensor;
  generate a combination light magnitude signal from the sensor data, the combination light magnitude signal representing a sum of white and infrared light incident on the image sensor;
  generate a difference signal by subtracting the white light magnitude signal from the combination light magnitude signal;
  compare the difference signal to first and second threshold values;
  switch from the visible light operating mode to the infrared light operating mode in response to the difference signal rising above the first threshold value; and
  switch from the infrared light operating mode to the visible light operating mode in response to the difference signal falling below the second threshold value.

3. The system of claim 1, the processor further configured to execute machine-readable instructions to:
  generate a white light magnitude signal from the sensor data, the white light magnitude signal representing green light incident on the image sensor;
  generate a combination light magnitude signal from the sensor data, the combination light magnitude signal representing a sum of green and infrared light incident on the image sensor;
  generate a difference signal by subtracting the white light magnitude signal from the combination light magnitude signal;
  compare the difference signal to first and second threshold values,
  switch from the visible light operating mode to the infrared light operating mode in response to the difference signal rising above the first threshold value, and
  switch from the infrared light operating mode to the visible light operating mode in response to the difference signal falling below the second threshold value.

4. The system of claim 1, the processor further configured to execute machine-readable instructions to:
  generate a visible light magnitude signal from the sensor data, the visible light magnitude signal representing a sum of red light, green light and blue light incident on the image sensor; and
  compare the visible light magnitude signal to first and second threshold values,
  switch from the visible light operating mode to the infrared light operating mode in response to the visible light magnitude signal falling below the first threshold value, and
  switch from the infrared light operating mode to the visible light operating mode in response to the visible light magnitude signal rising above the second threshold value.

5. The system of claim 1, further comprising:
  an infrared light source adapted to illuminate the scene with infrared light;
  the processor being further configured to execute machine-readable instructions to:
  activate the infrared light source in response to the system switching from the visible light operating mode to the infrared light operating mode, and
  deactivate the infrared light source in response to the system switching from the infrared light operating mode to the visible light operating mode.

6. The system of claim 1, wherein, in each of the plurality of combination light photodetectors:
  the first portion has a first cross-sectional area in a first plane perpendicular to the depth direction;
  the second portion has a second cross-sectional area in a second plane parallel to the first plane; and
  the second cross-sectional area is greater than the first cross-sectional area.

7. The system of claim 6, wherein the second portion of at least one of the plurality of combination light photodetectors extends under one or more the plurality of visible light photodetectors in the depth direction.

* * * * *